US010552455B2

(12) United States Patent
Walter

(10) Patent No.: US 10,552,455 B2
(45) Date of Patent: Feb. 4, 2020

(54) ANALYTICS ENABLEMENT FOR ENGINEERING RECORDS

(71) Applicant: SAP SE, Walldorf (DE)

(72) Inventor: Wolfgang Walter, Heidelberg (DE)

(73) Assignee: SAP SE, Walldorf (DE)

( * ) Notice: Subject to any disclaimer, the term of this patent is extended or adjusted under 35 U.S.C. 154(b) by 705 days.

(21) Appl. No.: 15/017,111

(22) Filed: Feb. 5, 2016

(65) Prior Publication Data

US 2017/0228450 A1    Aug. 10, 2017

(51) Int. Cl.
*G06F 16/28* (2019.01)
*G06F 16/904* (2019.01)

(52) U.S. Cl.
CPC .......... *G06F 16/283* (2019.01); *G06F 16/904* (2019.01)

(58) Field of Classification Search
CPC ...................................................... G06Q 10/06
See application file for complete search history.

(56) References Cited

U.S. PATENT DOCUMENTS

| | | | |
|---|---|---|---|
| 5,701,453 A * | 12/1997 | Maloney ............... | G06F 16/217 707/714 |
| 2003/0001885 A1* | 1/2003 | Lin ....................... | G06F 16/972 715/738 |
| 2004/0181417 A1 | 9/2004 | Piller et al. | |
| 2005/0004885 A1* | 1/2005 | Pandian ............ | G06F 17/30557 |
| 2008/0154749 A1 | 6/2008 | D'hooghe et al. | |
| 2009/0043592 A1 | 2/2009 | Heimann et al. | |
| 2011/0055214 A1* | 3/2011 | Mui ................... | G06F 17/30554 707/737 |
| 2011/0055250 A1* | 3/2011 | Nandy .............. | G06F 17/30554 707/769 |
| 2013/0006408 A1 | 1/2013 | Zakrzwski et al. | |
| 2013/0166568 A1* | 6/2013 | Binkert ............. | G06F 17/30911 707/741 |
| 2014/0040320 A1 | 2/2014 | Walter | |
| 2014/0279839 A1 | 9/2014 | Balzar et al. | |
| 2015/0088851 A1 | 3/2015 | Deshpande et al. | |
| 2016/0034915 A1* | 2/2016 | Soni ................... | G06O 30/0201 705/7.29 |

OTHER PUBLICATIONS

Srivastava et al, Answering Queries with Aggregation Using ViewsProceedings of the 22nd VLDB Conference Mumbai(Bombay), India, 1996, pp. 1-12 (Year: 1996).*

* cited by examiner

*Primary Examiner* — Cheyne D Ly
(74) *Attorney, Agent, or Firm* — Kent J. Tobin; Fountainhead Law Group PC

(57) ABSTRACT

The embodiments described herein are configured to annotate engineering record ("ER") data from database tables and their corresponding attributes for analytics tools consumption and to combine the database tables into one consumable entity that can expose a list of attributes to the customer. Attributes may be converted into standardized attributes based on analyzing attribute data types. This data can then be extracted by analytics tools via the common data reporting layer to generate one or more visualizations at a display of at a user's computer system. Such a solution requires far less technical understanding and implementation logic to enable users to focus on analytics rather than view building.

20 Claims, 7 Drawing Sheets

Engineering Records DB Layer 200

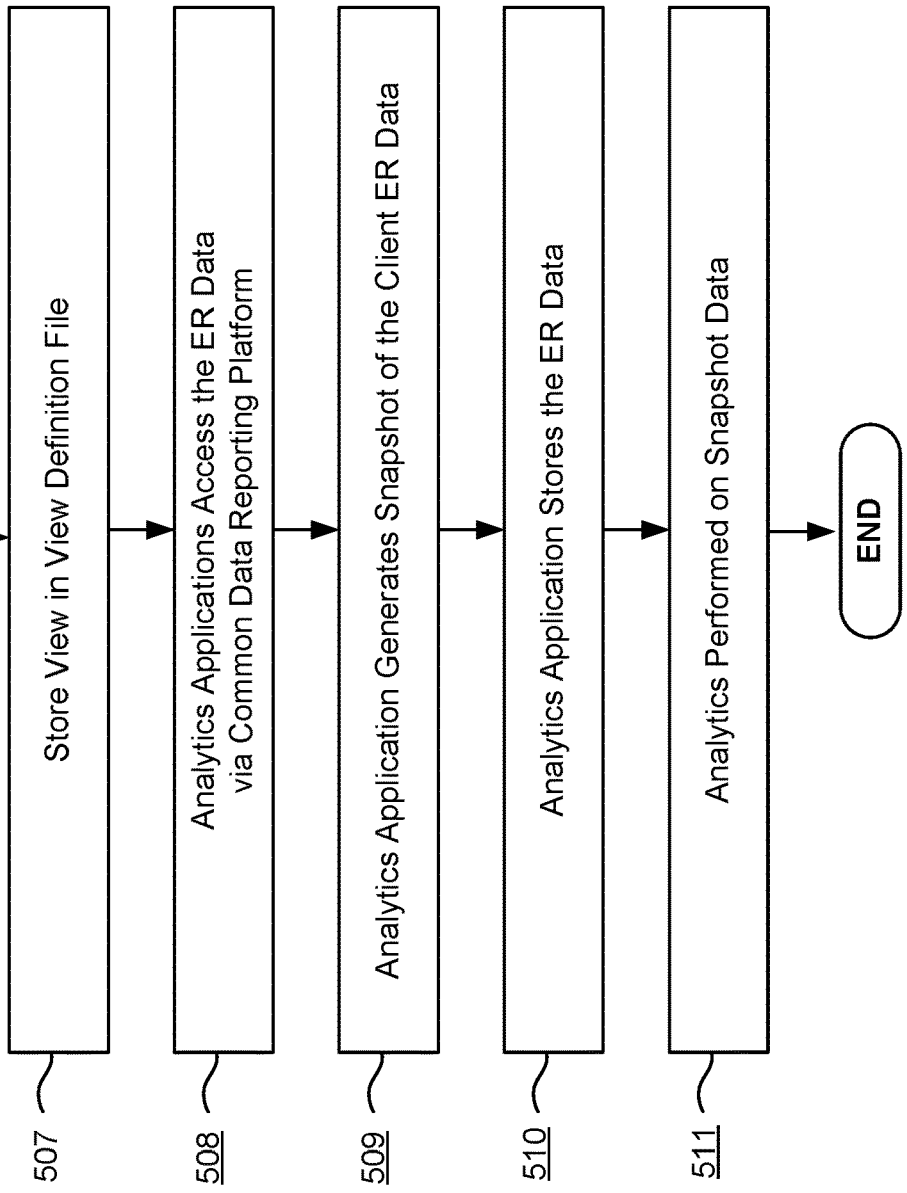

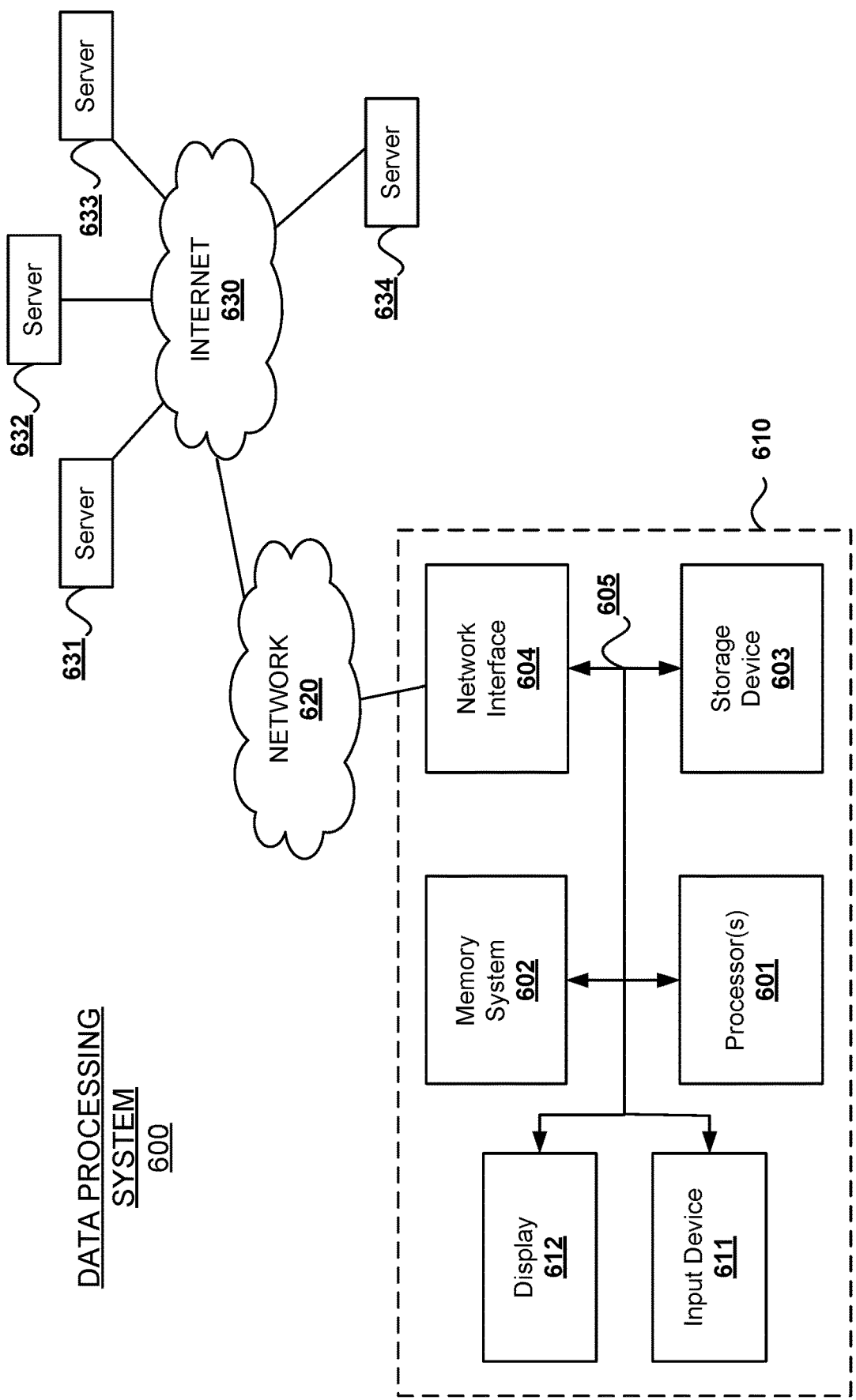

US 10,552,455 B2

ANALYTICS ENABLEMENT FOR ENGINEERING RECORDS

TECHNICAL FIELD

At least certain embodiments disclosed herein relate generally to data processing in a computer network, and more particularly to a system and method for enabling analytics reporting for engineering record data for multiple different systems.

BACKGROUND

Engineering records are used to manage change and release processes for projects or tasks within an organization, for monitoring documentation of the revision process for product development, store change statuses, workflow functionality, etc. An engineering record can be viewed as a folder object that stores multiple data objects related to the life cycle of an engineering project change request. Engineering records include a header and a list of change items, which may include data objects for creating the engineering record, record type, change number, reason for change (e.g., customer request, internal request, cost reduction measure, or technical issue, etc.), target dates for completion of milestones, documents and notes relating to the project, routing list for user communications about the project, workflow logs, etc.

An engineering record consists of header attributes and a list of change items (e.g., materials and documents) that are subject to change. A process workflow of an engineering record determines which users or departments receive the engineering record for reviews and approvals. Engineering change request status management usually begins upon a triggering event or submission of a change request and continues until the project associated with the change request is complete. It is important for entities to be able to monitor these change and release processes, thus analytics capabilities are needed to identify success rates for the processes, identify any bottlenecks, and to determine how many engineering records exist and at what status, etc. Once the engineering record reaches the completed stage, the actual object changes may be executed.

One key feature of engineering records is that different engineering record types can be configured to reflect different kinds of change and release processes. Engineering records can be customized for a particular business, industry, or organization, and can be customized on different engineering record types to tailor customer-specific processes and to persist customer-specific attributes that are not part of any standard analytics reporting layer. The entities may each have their own customized database tables (or other data structures) and corresponding customer-specific attributes that will be used to store their engineering record data. In addition, a particular system may contain multiple different database tables for storing the engineering record header data.

Unfortunately, many of these customized database tables are not recognized by standard analytics applications, and thus it is a challenge to generate views of the engineering records data for consumption by such applications. Conventionally, customers must manually create database views for their customized database tables or they must model them inside a particular analytics tool using join conditions (e.g., using sequential query language ("SQL") joins). This requires a lot of creation and maintenance effort as well as in-depth knowledge of databases and SQL.

SUMMARY

The embodiments described herein include improved systems and methods for enabling analytics reporting for engineering record data. In one embodiment, a method is disclosed comprising extracting, by a server via a communications network, client engineering record data comprising engineering record data structures and corresponding attributes, storing the engineering record data structures and attributes in a database in communication with the server, generating a view of the client engineering record data that specifies relationships between the data structures and corresponding attributes.

In one embodiment, generating the view comprises combining the engineering record data structures with one or more standard data structures, identifying attribute classes for the attributes, wherein each attribute corresponds to one field in the generated view, renaming the attributes with standard attribute names based on the identified attribute classes, and storing the view in a view definition file in a repository, wherein the view definition file is accessed by a data reporting platform that enables analytics reporting across a plurality of different engineering record types of a plurality of different client systems.

In one embodiment, the view enables standardized analytics reporting across a plurality of different analytics applications. Analytics applications may then be configured to access the client engineering record data via the data reporting platform, generate a snapshot of the client engineering record data at different points in time to obtain snapshot data, store the snapshot data, and perform analytics operations on the snapshot data to generate one or more visualizations of the client engineering record data.

In one embodiment, the analytics application is an online analytics service operable to consume the client engineering record data in real time and perform analytics operations. The view may be based at least in part on a configuration of the client system. Settings in a report executed by the client system may be adapted to enable control of generating the view of the client engineering record data.

In one embodiment, the method further comprises generating a plurality of views of the client engineering record data for dedicated groups or engineering record types. In addition, the data structures and attributes of the client engineering record data that are not relevant for performing analytics operations may be excluded.

In another embodiment, a system for enabling analytics reporting for engineering record data is disclosed comprising a server, a database in communication with the server via a network, and a system memory configured to store programmed computer code, which when executed by the server, causes the server to perform operations. These operations may comprise extracting client engineering record data comprising engineering record data structures and corresponding attributes, storing the engineering record data structures and attributes in a database in communication with the server, generating a view of the client engineering record data that specifies relationships between the data structures and corresponding attributes. In one embodiment, generating the view may comprise combining the engineering record data structures with one or more standard data structures, identifying attribute classes for the attributes, wherein each attribute corresponds to one field in the generated view, renaming the attributes with standard attribute names based on the identified attribute classes, and storing the view in a view definition file in a repository. The view definition file may be accessed by a data reporting platform that enables analytics reporting across a plurality of different engineering record types of a plurality of different client systems.

In yet other embodiments, a computer readable storage medium embodying programmed computer code is disclosed, which when executed by a server computer, causes the server computer to perform operations for enabling analytics reporting for engineering record data. In one embodiment, the operations comprise extracting, by a server via a communications network, client engineering record data comprising engineering record data structures and corresponding attributes, storing the engineering record data structures and attributes in a database in communication with the server, generating a view of the client engineering record data that specifies relationships between the data structures and corresponding attributes. In one embodiment, generating the view comprises combining the engineering record data structures with one or more standard data structures, identifying attribute classes for the attributes, wherein each attribute corresponds to one field in the generated view, renaming the attributes with standard attribute names based on the identified attribute classes, and storing the view in a view definition file in a repository. In one embodiment, the view definition file is accessed by a data reporting platform that enables analytics reporting across a plurality of different engineering record types of a plurality of different client systems.

The following detailed description and accompanying drawings provide a better understanding of the nature and advantages of the present disclosure.

BRIEF DESCRIPTION OF THE DRAWINGS

For a better understanding of at least certain embodiments, reference will be made to the following detailed description, which is to be read in conjunction with the accompanying drawings.

FIGS. 5A-5B depict example flow charts illustrating an embodiment of a process for enabling analytics reporting for engineering record data according to the techniques described herein.

FIG. 6 depicts an example overview block diagram of a data processing system upon which the embodiments described herein may be implemented.

DETAILED DESCRIPTION

Throughout the description, for the purposes of explanation, numerous specific details are set forth in order to provide a thorough understanding of the present disclosure. It will be apparent to one skilled in the art, however, that the techniques described herein may be practiced without some of these specific details. In other instances, well-known structures and devices may be shown in block diagram form to avoid obscuring the underlying principles of the techniques described herein.

The embodiments and techniques described herein relate to an improved system and method for generating optimized views of engineering record data which can be used for analytics reporting. A view refers to an entity that is not persistent and that is a projection of other entities. A view includes functions and expressions for visualizing relationships between data and corresponding attributes (and other metadata). These techniques include combining multiple non-standard database tables into a common data reporting layer comprising data relevant for performing analytics operations.

Figure 1:
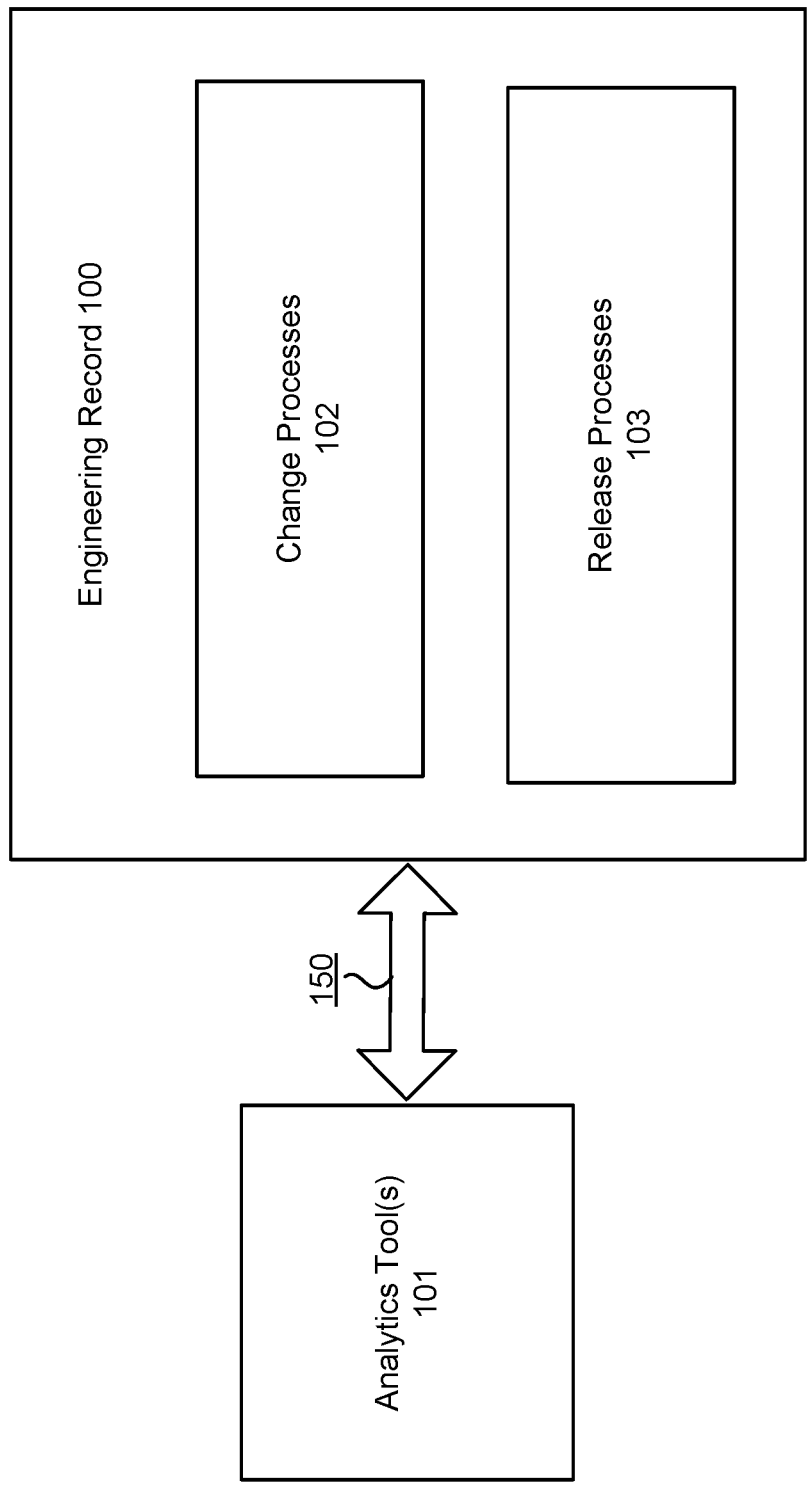
FIG. 1 depicts an engineering record in communication with one or more analytics tools via one or more networks.

FIG. 1 depicts an engineering record in communication with one or more analytics tools via one or more networks. In the illustrated embodiment, engineering record 100 comprises change processes 102 and release processes 103. In addition, the engineering record data may be provided to one or more different analytics tools 101 via one or more networks 150. Users may execute a report to generate the common analytics data reporting layer. When the report is executed, it gathers the required information (e.g., database tables and their attributes) based on the system configuration and customization and generate a new view in the common data reporting layer or overwrite/update an existing view. In addition, multiple views may be generated. A user may generate a use-case specific view of engineering record data may be generated that contains only relevant database tables and attributes for a particular use case.

The embodiments described herein are configured to annotate engineering record data from a users' database tables and their corresponding attributes for analytics tools consumption and to combine the database tables into one consumable entity that can expose a list of attributes to the customer. Attributes may be converted into standardized attributes based on analyzing attribute data types. This data can then be extracted by analytics tools via the common data reporting layer to generate one or more visualizations at a display of at a user's computer system.

Such a solution requires far less technical understanding and implementation logic to enable users to focus on analytics rather than view building and SQL joins. The views generated via the common data reporting layer may provide readable attribute names as well as metadata that allows users to interpret the semantics of the attributes, e.g., as a "dimension" for aggregation or as a "measure" for calculated values, and provide them in a visualization to the client system. In a pie chart, for example, the measures may be the area within the pie chart that would be divided up according to the dimensions. In a bar chart, on the other hand, the dimensions may be placed along the X-axis and the measures may be placed along the Y-axis. Measures may also be assigned an aggregation type such as sum, difference, average value, etc.

Figure 2:
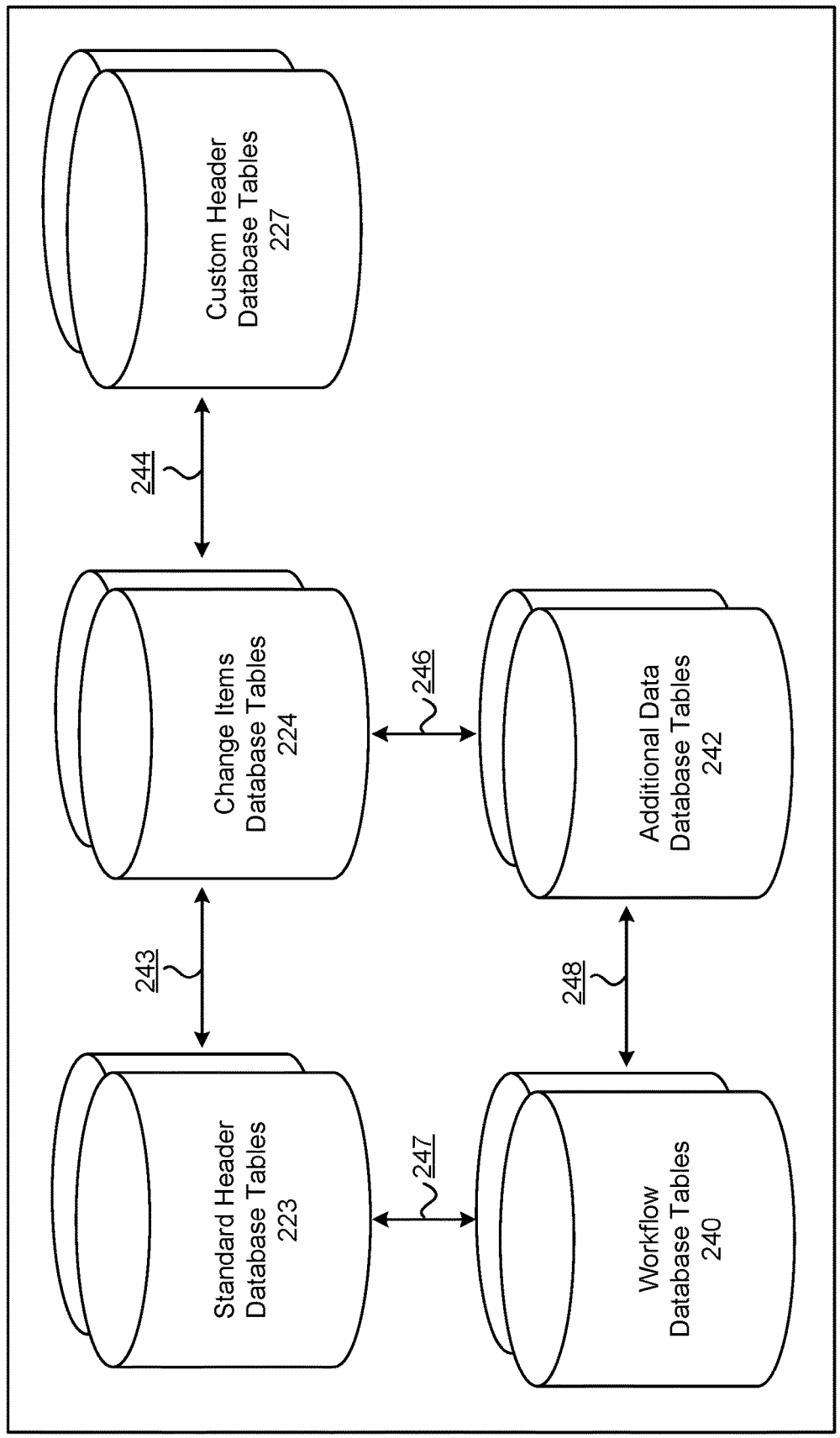
FIG. 2 depicts an example block diagram of an embodiment of a system for enabling analytics reporting for engineering record data according to the techniques described herein.

FIG. 2 depicts an example block diagram of an embodiment of a system for enabling analytics reporting for engineering record data according to the techniques described herein. In the illustrated embodiment, engineering records database layer 200 includes a set of standard header database tables 223 (or other data structures) and a set of change items database tables 224. The engineering records database layer 200 may include multiple database tables distributed between different applications. The header data may be distributed between one central database as well as type-specific databases, which can be a standard table or a user-specific table. Whenever a change process is triggered, the engineering records may be assigned object, documents, notes, etc. These objects and other information can be stored in the change items database tables 224 and referenced to both the standard header database tables 223 via a reference 243 and the customer header database tables 227 via a reference 244.

The change items data may also include standard database tables or a user-specific database tables. The change items in database 224 include objects relevant for the engineering change, e.g., materials, documents, and product structures. They may be attached as 1 to n relationship to the header. Storage of this information may be done in object-type specific database tables.

The header data may also be assigned a workflow and stored in the workflow database tables 240, and referenced via a reference 247. The workflow may have a 1 to 1 relationship with the header stored in the standard header database tables 223. The workflow stored in the workflow database tables 240 may be used to send the engineering record to the relevant parties (e.g., engineers, designers, etc.).

Additional data database tables 242 may also be provided to attach classification documents with additional data. The additional data database tables 242 may be referenced by the workflow data in the workflow database tables 240 via a reference 248 and may be referenced by the change items data stored in the change items database tables 224 via a reference 246.

I. Exemplary Systems

Provided below is a description of an example system upon which the embodiments described herein may be implemented. Although certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described herein. The described functionality may be performed by custom hardware components containing hardwired logic for performing operations, or by any combination of hardware and programmed computer components. The techniques described herein are not limited to any specific combination of hardware circuitry or software. Embodiments can also be practiced in distributed computing environments where tasks are performed by remote data processing devices or systems that are linked through one or more wire-based or wireless networks.

Figure 3:
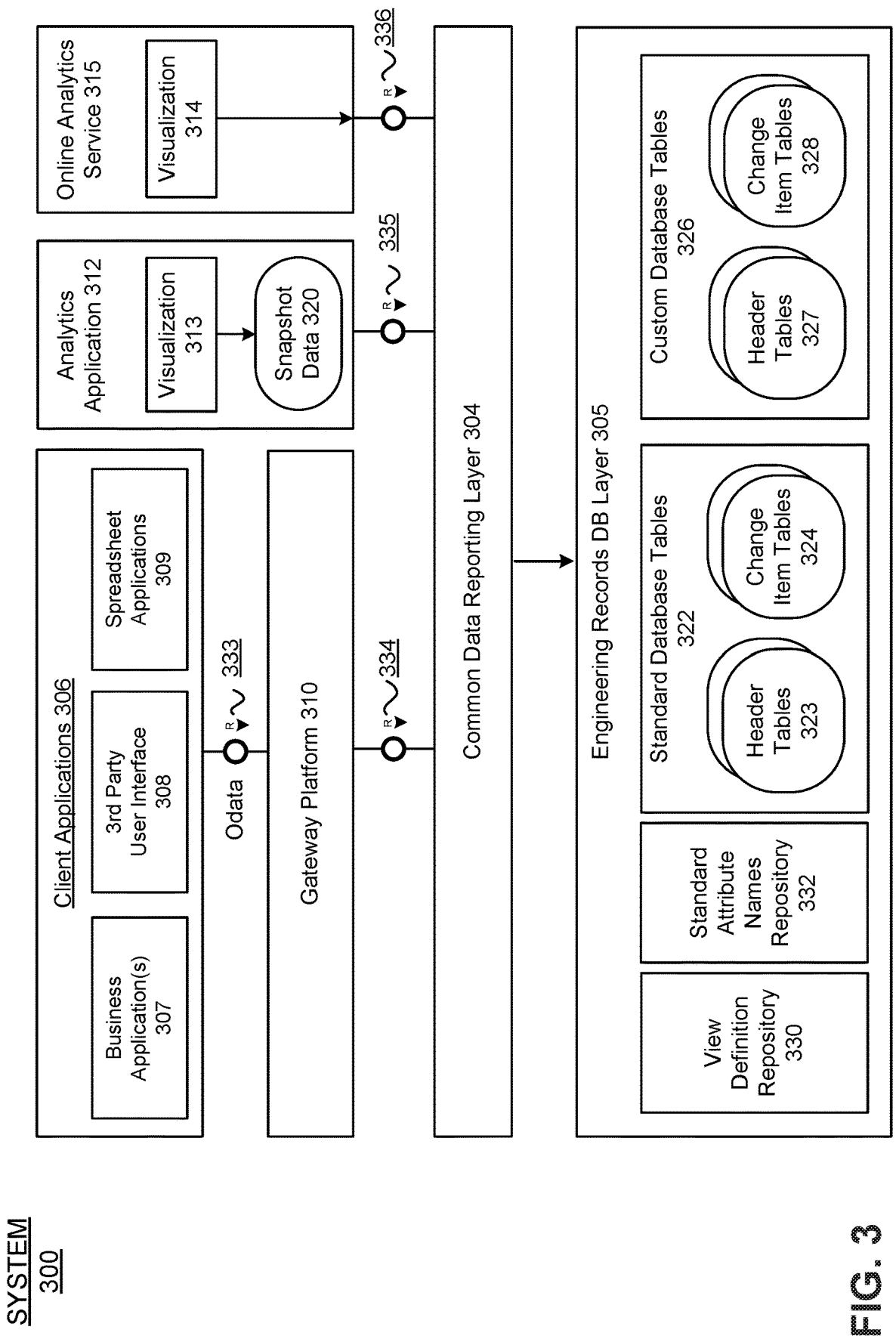
FIG. 3 depicts an engineering record database layer configured according to the techniques described herein.

FIG. 3 depicts an example block diagram of an embodiment of a system for enabling analytics reporting for engineering record data according to the techniques described herein. In the illustrated embodiment, system 300 includes a common data reporting layer 304 that provides access to the underlying database tables in the engineering record database layer 305 for one or more client applications 306 and one or more analytics applications 312 and 315. The client applications may include various business applications 307, third party user interfaces 308, or spreadsheet applications 309, etc.

A report may be provided to generate a common view that provides access to the underlying database tables in the engineering record database layer 305. The view may operate to combine the standard database tables 322 and the customer database tables 326 with standard content. The standard database tables 322 include header tables 323 and change items tables 324 and the customer database tables 326 includes header tables 327 and change items tables 328.

In one embodiment, the analytics applications 312 may be stored on a client system (not shown). In such a case, client data may be extracted from the engineering records database layer 305 at different points in time and stored as snapshot data 320 on the client's system. The snapshot data 320 may be consumed by the analytics application 312 to provide one or more visualizations 313 to the client based on performing analytics operations on the snapshot data 320. This data may be extracted via a read request 335 and consumed by the analytics application 312. This may be done upfront by a analytics developer, for example, and may perform operations on the snapshot data.

In another embodiment, the analytics applications may be provided as an online analytics service 315. In that case the online analytics service 315 may provide the analytics via a live connection 336 without having to extract the snapshot data. The client data can be read online using the online analytics service 315, which may also provide one or more visualizations 314 in a graphical interface at the client's device or system. The online analytics service 315 may be consumed by the client applications 306 using OData 333 or some other communications protocol or link.

The client system may interact with a server computer (not shown) that is configured to store the common data reporting layer 304 and the engineering records DB layer 305 via a gateway platform 310 via read requests 334. The engineering records DB layer 305 may include a view definition repository 330 configured to store view definitions of the views generated by the common data reporting layer 304. Standard attributes for the view definitions may be stored in the standard attribute names repository 332. In one embodiment, the repositories 330 and 332 may be combined into a single repository.

Figure 4:
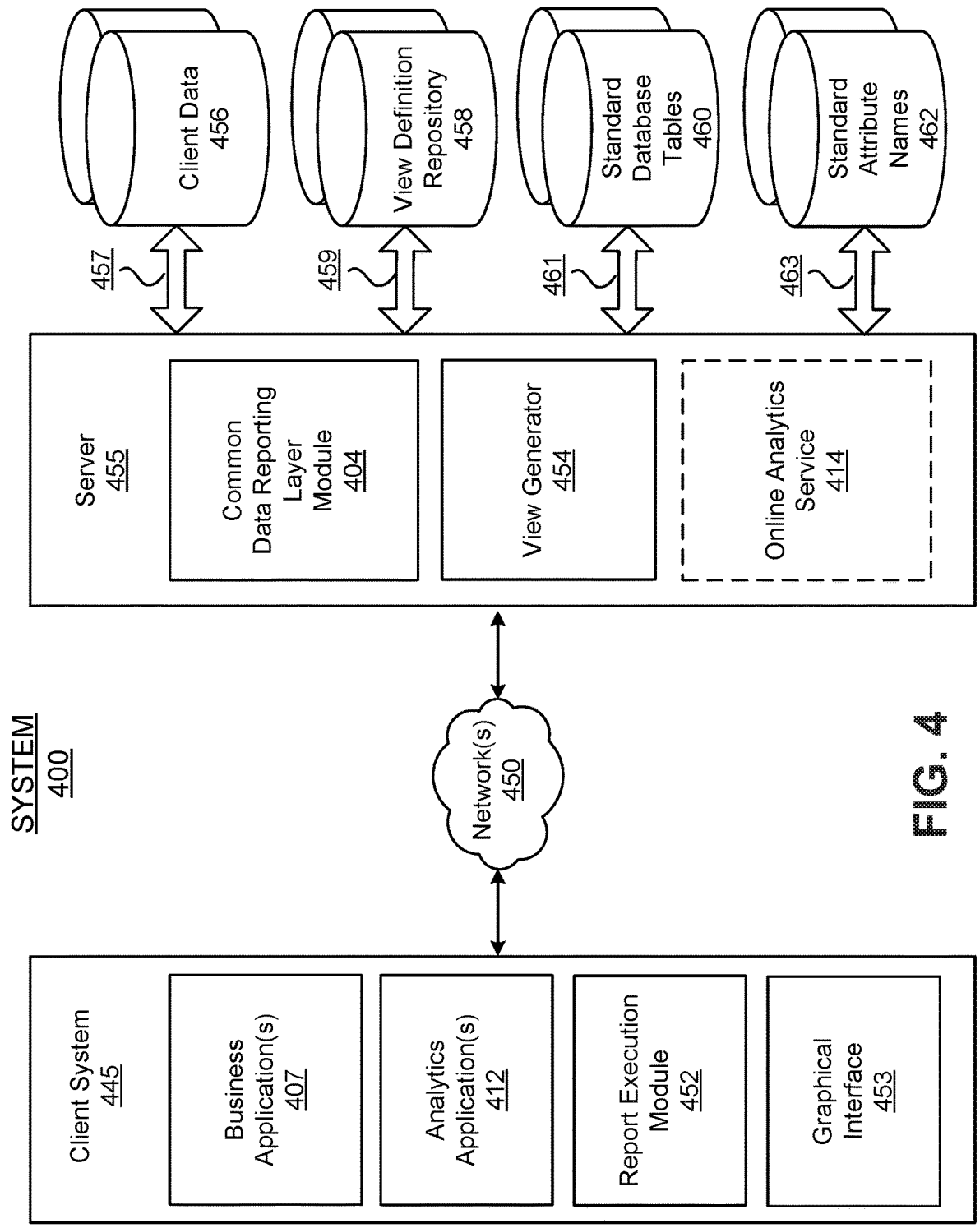
FIG. 4 depicts an example block diagram of an embodiment of a system for enabling analytics reporting for engineering record data according to the techniques described herein.

FIG. 4 depicts an engineering record database layer configured according to the techniques described herein. In the illustrated embodiment, a client system 445 is in communication with a server 455 via one or more networks 450. The client system 445 includes one or more business applications 407, analytics applications 412, a report execution module 452, and a graphical interface 453 for providing one or more visualizations resulting from performing analytics operations according to the techniques described herein. The client system 445 also includes one or more processors in communication with a system memory via an interconnect link as is well known in the art. The client system 445 also includes any necessary network interfaces for communicating over the one or more networks 450.

The report execution module 452 may be utilized to execute the reports that generate one or more views of the client data. The report may provide settings to control the view creation and multiple views are possible. The report may specify the relevant engineering record types to create one view for the tables or to provide specific views of a dedicated group or engineering record type (which may reflect different business processes. The report may also specify which attributes of the database tables are only relevant for analytics to assist in keeping the view "slim" to allow easier consumption of the data in an analytics tool.

The report may also trigger conversion of data fields for optimized analytics consumption. For example, time stamps may be converted into separate date and time fields. The report may also enable renaming of attribute names to replace technical database attribute names with readable names. Upper and lower case capability may also be provided. The generated views may also offer additional features like using global data types as attribute names.

In the illustrated embodiment, the server 455 includes a common data reporting module 404 configured to provide the common data reporting layer 304. The server 455 also includes a view generator module 454 and, optionally, an online analytics service 414. The view generator 454 may generate one or more views of client data stored in the client data database 456 via link 457 in response to the settings in the report executed at the client system 445. The view generator 454 may generate views and then store the corresponding view definitions in the view definition repository 458 via link 459. The standard database tables for the view may be stored in database 460 via link 461 and the corresponding standard attributes in the standard attribute names database 462 via link 463.

Server 455 may be implemented as an individual computer hardware server, or as an array of computer servers physically or logically connected together and working in coordination to perform the functionality described herein. Generally, a data server includes a system that performs data operations with respect to data stored in one or more repositories of data. Depending on the type of data server, data operations may range from simple operations, such as storing and retrieving data, to more complex operations such as computing algorithms or calculating statistics based on the data, or arranging, modifying, or formatting the data.

Also, as will be appreciated by persons skilled in the art, networks 450 can be implemented as any wired or wireless networks. In addition, networks 450 can be implemented as a single wired or wireless network or multiple separate networks in communication with one another. For example, the networks described herein can be implemented as a local area network ("LAN"), wide-area network ("WAN"), combination of LANs and WANs, the Internet, or any other type of communication network adapted for exchanging electronic messages and information. Further, networks 450 can be implemented as a physical array of hardware resources or as a virtual array, or any combination thereof. They can also be implemented in a cloud-based network configuration. For example, networks 450 can be implemented as public or private cloud network, or combination thereof. No specific network or network architecture should be interpreted as limiting the embodiments and techniques described herein.

Business applications 407 may be mobile applications, for example. Graphical interface 453 is provided for users to interact with and execute the features of the applications 407. The applications 407 can be configured to perform data access operations on client data stored in the databases 456-462 by communicating data access requests/commands to the server 455 via network(s) 450. Server 455 can be configured to receive data access requests from the client applications 407, to query the databases to retrieve the requested data, and to provide responses including the requested data via network(s) 450.

Databases 456-462 may be adapted to store content data for use by the client applications 407. Server 455 may be in remote communication with the databases 456-462 via one or more communication links 457-463. Alternatively, databases 456-462 may be a component of the server 455 and configured to communicate with the server via an interconnect line or other direct or indirect connection or network. Databases 456-462 may be implemented as any type of database system. One example embodiment includes a relational database system, in which data is stored in structured tables comprised of rows and columns. Access may be provided through data storage rules or schemas. Other examples of database systems include event-based systems where data can be stored in a semi-structured or unstructured format.

The business applications 407 may include business enterprise applications such as applications for a purchasing, sales, marketing, or human resources departments, etc. For example, applications 407 can include a customer relationship management ("CRM") system or an enterprise resource planning ("ERP") system configured to store and provide information relating to products, services, financials, or user profile information for users of the client system 445.

II. Exemplary Processes

Figure 5A:
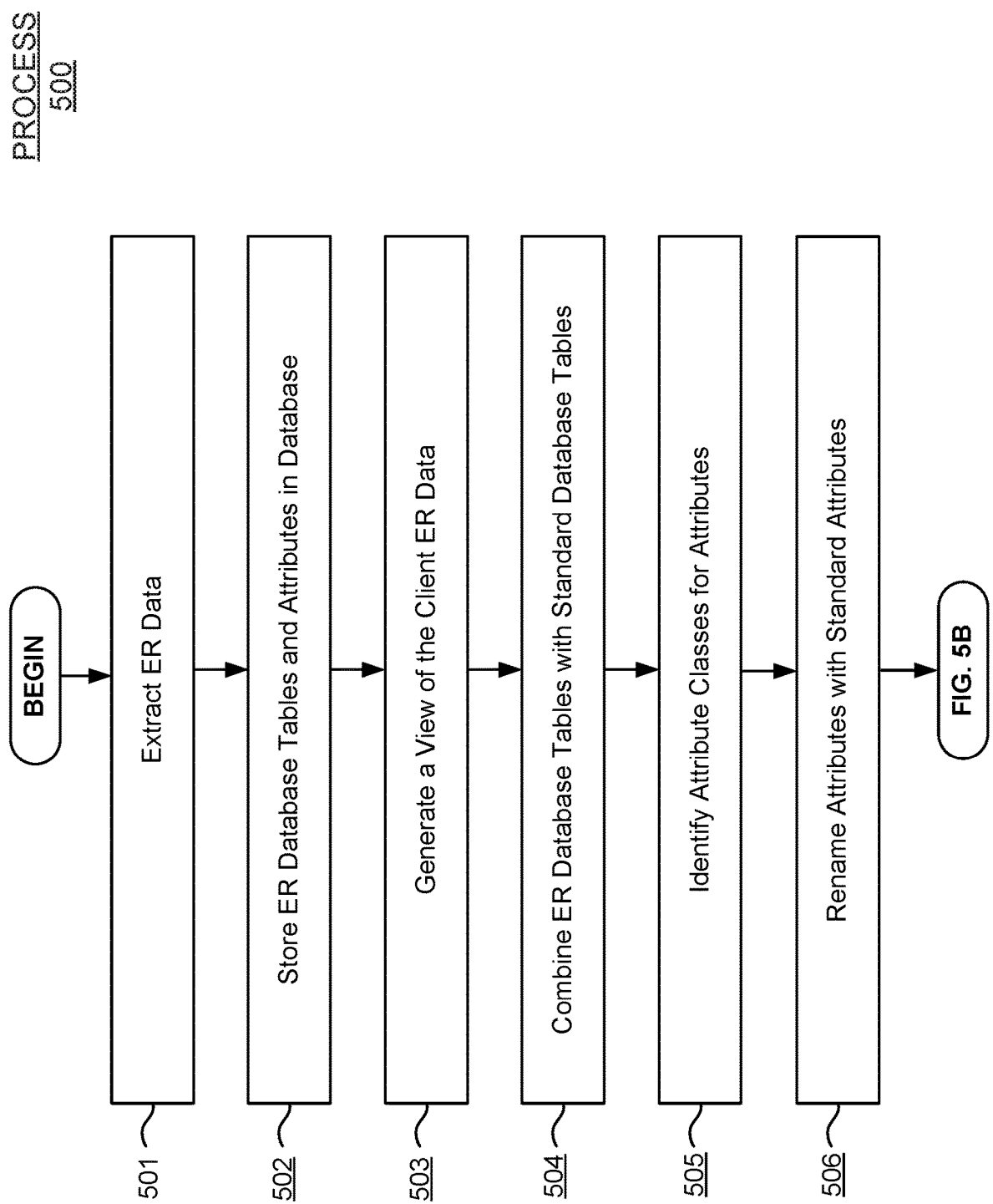

FIGS. 5A-5B depict example flow charts illustrating an embodiment of a process for enabling analytics reporting for engineering record data according to the techniques described herein. It is noted that the processes described below are exemplary in nature and are provided for illustrative purposes and not intended to limit the scope of the disclosure to any particular example embodiment. For instance, methods in accordance with some embodiments described herein may include or omit some or all of the operations described below, or may include steps in a different order than described herein. The particular methods described are not intended to be limited to any particular set of operations exclusive of all other potentially intermediate operations.

In addition, the operations may be embodied in computer-executable code, which causes a general-purpose or special-purpose computer to perform certain functional operations. In other instances, these operations may be performed by specific hardware components or hardwired circuitry, or by any combination of programmed computer components and custom hardware circuitry.

In the illustrated embodiment of FIG. 5A, process 500 begins at operation 501 by extracting client engineering record ("ER") data having ER data structures and corresponding attributes and storing the ER data structures and attributes in a database in communication with the server (operation 502). A view of the client ER data may then be generated that specifies the relationships between the database tables (or other data structures) and the corresponding attributes (operation 503). The view may be generated by combining the ER data structures with one or more standard data structures (operation 504), identifying attribute classes for the attributes (operation 505), renaming the attributes with standard attribute names based on the identified attribute classes (operation 506). In one embodiment, the data is extracted by a server in communication with a client system via a communications network as discussed previously. In addition, each attribute may correspond to one field in the generated view.

Process 500 continues on FIG. 5B by storing the view in a view definition file in a repository (operation 507). The view definition file may be accessed by a data reporting platform that enables analytics reporting across a plurality of different engineering record types of a plurality of different client systems. The view enables standardized analytics reporting across a plurality of different analytics applications.

The analytics applications may be configured to access the client engineering record data via the common data reporting platform (operation 508), generate a snapshot of the client ER data at different points in time to obtain snapshot data (operation 509), store the snapshot data (operation 510), and perform analytics operations on the snapshot data to generate one or more visualizations of the client engineering record data (511).

In one embodiment, the analytics application may be an online analytics service operable to consume the client ER data in real time and perform analytics operations on that data in real time. The view may be based at least in part on a configuration of the client system. The settings in a report executed by the client system 445 enable control of generating the view of the client engineering record data.

In one embodiment, multiple views of the client ER data may be generated for dedicated groups or engineering record types. Also, the data structures and attributes of the client engineering record data that are not relevant for performing analytics operations may be excluded to keep the view slim as described earlier.

III. Exemplary Hardware Implementation

Embodiments of the present disclosure may be practiced using various computer systems including hand-held devices, microprocessor systems, programmable electronics, laptops, tablets and the like. The embodiments can also be practiced in distributed computing environments where tasks are performed by remote processing devices that are linked through one or more wire-based or wireless networks.

FIG. 6 depicts an example overview block diagram of a data processing system upon which the embodiments described herein may be implemented. The following hardware description is merely one example. It is to be understood that a variety of computers configurations may be used to implement the described techniques. While FIG. 6 illustrates various components of a data processing system 600, it is not intended to represent any particular architecture or manner of interconnecting components. It will also be appreciated that network computers and other data processing systems, which have fewer components or additional components, may be used. The data processing system 600 may, for example, comprise a personal computer (PC), workstation, laptop computer, tablet, smartphone or other hand-held wireless device, or any device having similar functionality.

In the illustrated embodiment, data processing system 600 includes a computer system 610. Computer system 610 includes an interconnect bus 605 (or other communication mechanism for communicating information) and one or more processor(s) 601 coupled with the interconnect bus 605 for processing information. Computer system 610 also includes a memory system 602 coupled with the one or more processors 601 via the interconnect bus 605. Memory system 602 is configured to store information and instructions to be executed by processor 601, including information and instructions for performing the techniques described above. This memory system may also be used for storing programs executed by processor(s) 601. Possible implementations of this memory system may be, but are not limited to, random access memory (RAM), read only memory (ROM), or combination thereof.

In the illustrated embodiment, a storage device 603 is also provided for storing information and instructions. Typically storage device 603 comprises nonvolatile memory. Common forms of storage devices include, for example, a hard drive, a magnetic disk, an optical disk, a CD-ROM, a DVD, a flash or other non-volatile memory, a USB memory card, or any other computer-readable medium from which a computer can read data and instructions. Storage device 603 may store source code, binary code, or software files for performing the techniques above. In addition, while FIG. 6 shows that storage device 603 as a local device connected with the components of the data processing system, it will be appreciated by skilled artisans that the described techniques may use a storage device remote from the system, such as a database or other network storage device coupled with the computer system 610 through a network interface such as network interface 604.

Network interface 604 may provide communications between computer system 610 and a network 620. The network interface 604 may be a wireless or wired connection, or any combination thereof. Computer system 610 is configured to send and receive information through the network interface 604 across one or more networks 620 such as a local area network (LAN), wide-area network (WAN), wireless or Bluetooth network, or the Internet 630, etc. Computer system 610 may access data and features on systems residing on one or multiple different hardware servers 631-634 across the network 620. Hardware servers 631-634 and associated server software may also reside in a cloud computing environment.

Storage device and memory system are both examples of non-transitory computer readable storage media. Embodiments herein can be embodied in computer-readable code stored on any computer-readable medium, which when executed by a computer or other data processing system, can be adapted to cause the system to perform operations according to the techniques described herein. Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Computer-readable media can also be distributed over a network-coupled computer system stored and executed in a distributed fashion.

Further, computer system 610 may be coupled via interconnect bus 605 to a display 612 for displaying information to a computer user. An input device 611 such as a keyboard, touchscreen, and/or mouse is coupled to bus 605 for communicating information and command selections from the user to processor 601. The combination of these components allows the user to communicate with the system. In some systems, bus 605 represents multiple specialized interconnect buses.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a computer system. The techniques may be carried out in a computer system or other data processing system in response executing sequences of instructions stored in memory.

Throughout the foregoing description, for the purposes of explanation, numerous specific details were set forth in order to provide a thorough understanding of the disclosure. It will be apparent, however, to persons skilled in the art that these embodiments may be practiced without some of these specific details. The above examples and embodiments should not be deemed to be the only embodiments, and are presented to illustrate the flexibility and advantages of the present disclosure. Other arrangements, embodiments, implementations and equivalents will be evident to those skilled in the art and may be employed without departing from the spirit and scope of the disclosure as defined by the following claims.

What is claimed is:

1. A method for enabling analytics reporting for engineering record data, the method comprising:
   extracting, by a server via a communications network, client engineering record data comprising engineering record data structures and corresponding attributes;
   storing the engineering record data structures and attributes in a database in communication with the server;
   generating a view of the client engineering record data that specifies relationships between the data structures and corresponding attributes, wherein generating the view comprises:
      combining the engineering record data structures with one or more standard data structures utilizing,
         a first reference between a change table of the database and a standard header table storing a header with a 1:n relationship between an attribute of the change table and the header,
         a second reference between the change table and a custom header table the second reference being the only reference to the custom header table, and
         a third reference between the standard header table and a workflow database table storing a 1:1 relationship between a workflow and the header;
      identifying attribute classes for the attributes, wherein each attribute corresponds to one field in the generated view;
      renaming the attributes with standard attribute names based on the identified attribute classes;
      interpreting an attribute as a measure;
      assigning an aggregation type to the measure; and
   storing the view in a view definition file in a repository, wherein workflow data present in the view is accessed exclusively through the 1:1 relationship with the header, wherein the view definition file is accessed by a data reporting platform that enables analytics reporting across a plurality of different engineering record types of a plurality of different client systems, and wherein the analytics reporting includes an aggregation operation according to the aggregation type.

2. The method of claim 1 wherein the view enables standardized analytics reporting across a plurality of different analytics applications.

3. The method of claim 1 wherein the analytics application is configured to:
   access the client engineering record data via the data reporting platform;
   generate a snapshot of the client engineering record data at different points in time to obtain snapshot data;
   store the snapshot data; and
   perform analytics operations on the snapshot data to generate one or more visualizations of the client engineering record data.

4. The method of claim 1 wherein the analytics application is an online analytics service operable to consume the client engineering record data in real time and perform analytics operations thereupon.

5. The method of claim 1 wherein the view is based at least in part on a configuration of the client system.

6. The method of claim 1 wherein settings in a report executed by the client system are adapted to enable control of generating the view of the client engineering record data.

7. The method of claim 1 further comprising generating a plurality of views of the client engineering record data for dedicated groups or engineering record types.

8. The method of claim 1 wherein data structures and attributes of the client engineering record data that are not relevant for performing analytics operations are excluded.

9. A system for enabling analytics reporting for engineering record data comprising:
   a server;
   a database in communication with the server via a network; and
   a system memory configured to store programmed computer code, which when executed by the server, causes the server to perform operations comprising:
   extracting client engineering record data comprising engineering record data structures and corresponding attributes;
   storing the engineering record data structures and attributes in a database in communication with the server;
   generating a view of the client engineering record data that specifies relationships between the data structures and corresponding attributes, wherein generating the view comprises:
      combining the engineering record data structures with one or more standard data structures utilizing,
         a first reference between a change table of the database and a standard header table storing a header with a 1:n relationship between an attribute of the change table and the header,
         a second reference between the change table and a custom header table the second reference being the only reference to the custom header table, and
         a third reference between the standard header table and a workflow database table storing a 1:1 relationship between a workflow and the header;
      identifying attribute classes for the attributes, wherein each attribute corresponds to one field in the generated view;
      renaming the attributes with standard attribute names based on the identified attribute classes;
      interpreting an attribute as a measure;
      assigning an aggregation type to the measure; and
   storing the view in a view definition file in a repository, wherein workflow data present in the view is accessed exclusively through the 1:1 relationship with the header, wherein the view definition file is accessed by a data reporting platform that enables analytics reporting across a plurality of different engineering record types of a plurality of different client systems, and wherein the analytics reporting includes an aggregation operation according to the aggregation type.

10. The system of claim 9 wherein the view enables standardized analytics reporting across a plurality of different analytics applications.

11. The system of claim 9 wherein an analytics application is configured to generate a snapshot of the client engineering record data at different points in time and to perform analytics operations on one or more of the snapshots.

12. The system of claim 9 wherein the analytics application is an online analytics service operable to consume the client engineering record data in real time and perform analytics operations thereupon.

13. The system of claim 9 further comprising generating a plurality of views of the client engineering record data for dedicated groups or engineering record types.

14. The system of claim 9 wherein data structures and attributes of the client engineering record data that are not relevant for performing analytics operations are excluded.

15. A non-transitory computer readable storage medium embodying programmed computer code, which when executed by a server computer, causes the server computer to perform operations for enabling analytics reporting for engineering record data, the operations comprising:
  extracting, by a server via a communications network, client engineering record data comprising engineering record data structures and corresponding attributes;
  storing the engineering record data structures and attributes in a database in communication with the server;
  generating a view of the client engineering record data that specifies relationships between the data structures and corresponding attributes, wherein generating the view comprises:
    combining the engineering record data structures with one or more standard data structures utilizing,
      a first reference between a change table of the database and a standard header table storing a header with a 1:n relationship between an attribute of the change table and the header,
      a second reference between the change table and a custom header table, the second reference being the only reference to the custom header table, and
      a third reference between the standard header table and a workflow database table storing a 1:1 relationship between a workflow and the header;
    identifying attribute classes for the attributes, wherein each attribute corresponds to one field in the generated view;
    renaming the attributes with standard attribute names based on the identified attribute classes;
    interpreting an attribute as a measure;
    assigning an aggregation type to the measure; and
  storing the view in a view definition file in a repository, wherein workflow data present in the view is accessed exclusively through the 1:1 relationship with the header, wherein the view definition file is accessed by a data reporting platform that enables analytics reporting across a plurality of different engineering record types of a plurality of different client systems, and wherein the analytics reporting includes an aggregation operation according to the aggregation type.

16. The computer readable storage medium of claim 15 wherein the view enables standardized analytics reporting across a plurality of different analytics applications.

17. The computer readable storage medium of claim 15 wherein the analytics application is operable to:
  access the client engineering record data via the data reporting platform;
  generate a snapshot of the client engineering record data at different points in time to obtain snapshot data;
  store the snapshot data; and
  perform analytics operations on the snapshot data to generate one or more visualizations of the client engineering record data.

18. The computer readable storage medium of claim 15 wherein the analytics application is an online analytics service operable to consume the client engineering record data in real time and perform analytics operations thereupon.

19. The computer readable storage medium of claim 15 wherein the operations further comprise generating a plurality of views of the client engineering record data for dedicated groups or engineering record types.

20. The computer readable storage medium of claim 15 wherein data structures and attributes of the client engineering record data that are not relevant for performing analytics operations are excluded.

* * * * *